United States Patent [19]

Behn et al.

[11] 4,170,665

[45] Oct. 9, 1979

[54] METHOD OF MAKING IMPREGNATED ELECTRICAL CAPACITOR EMPLOYING PLASTIC FOIL DIELECTRIC

[75] Inventors: Reinhard Behn; Josef Lauber; Karl-Heinz Preibinger, all of Munich; Hans-Heinz Rheindorf, Heidenheim, all of Fed. Rep. of Germany

[73] Assignee: Siemens Aktiengesellschaft, Berlin & Munich, Fed. Rep. of Germany

[21] Appl. No.: 789,445

[22] Filed: Apr. 21, 1977

Related U.S. Application Data

[60] Division of Ser. No. 650,621, Jan. 20, 1976, abandoned, which is a continuation of Ser. No. 308,022, Nov. 27, 1972, abandoned, which is a continuation of Ser. No. 856,220, Sep. 8, 1969, abandoned, which is a continuation of Ser. No. 689,493, Dec. 11, 1967, abandoned.

[30] Foreign Application Priority Data

Dec. 23, 1966 [DE] Fed. Rep. of Germany ......... 107565

[51] Int. Cl.$^2$ .................... H01G 4/22; H01G 4/32
[52] U.S. Cl. ................................. 427/79; 29/25.42; 252/63; 361/315; 427/81; 427/177; 427/372 R
[58] Field of Search ............... 427/79, 81, 372 R, 177; 361/314, 315; 29/25.42; 252/63

[56] References Cited

U.S. PATENT DOCUMENTS

| | | | |
|---|---|---|---|
| 2,470,826 | 5/1949 | McMahon | 361/314 |
| 2,935,668 | 5/1960 | Robinson et al. | 361/314 |
| 2,938,153 | 5/1960 | Netherwood | 361/314 |
| 2,951,002 | 8/1960 | Ruscito | 156/184 |
| 3,215,909 | 11/1965 | Schill et al. | 361/314 |
| 3,253,199 | 5/1966 | Cozens | 361/314 |
| 3,346,789 | 10/1967 | Robinson | 361/314 |
| 3,363,156 | 1/1968 | Cox | 361/314 |
| 3,450,968 | 6/1969 | Cox | 361/314 |

FOREIGN PATENT DOCUMENTS

| | | |
|---|---|---|
| 443322 | 4/1925 | Fed. Rep. of Germany . |
| 893381 | 7/1949 | Fed. Rep. of Germany . |
| 832640 | 2/1952 | Fed. Rep. of Germany . |
| 876274 | 3/1953 | Fed. Rep. of Germany . |
| 756622 | 2/1954 | Fed. Rep. of Germany . |
| 1022696 | 1/1958 | Fed. Rep. of Germany . |
| 1050447 | 2/1959 | Fed. Rep. of Germany . |
| 1043511 | 4/1959 | Fed. Rep. of Germany . |
| 19831 | of 1960 | Fed. Rep. of Germany . |
| 1079203 | 4/1960 | Fed. Rep. of Germany . |
| 1131288 | 6/1962 | Fed. Rep. of Germany . |
| 976509 | 10/1963 | Fed. Rep. of Germany . |
| 1131807 | 10/1963 | Fed. Rep. of Germany . |
| 1489966 | 3/1969 | Fed. Rep. of Germany . |
| 1640188 | 3/1974 | Fed. Rep. of Germany . |
| 977182 | 7/1975 | Fed. Rep. of Germany . |
| 897310 | 3/1945 | France . |
| 1396531 | of 1965 | France . |
| 1405163 | of 1965 | France . |
| 6616148 | 5/1967 | Netherlands . |
| 956667 | 9/1966 | Sweden . |
| 156966 | of 1973 | Sweden . |
| 686293 | 1/1953 | United Kingdom . |
| 781763 | 8/1957 | United Kingdom . |
| 995507 | 6/1965 | United Kingdom . |
| 1030825 | 5/1966 | United Kingdom . |
| 1045527 | 10/1966 | United Kingdom . |

OTHER PUBLICATIONS von Hippel, Tables of Dielectric Materials, p. 366.
Modern Dielectric Material, von Birks, pp. 140 to 143, 1962.
An Introduction to Polymer Chemistry, Moore, University of London Press, 1963.
Elektrotechnise Zeitschrift, 12–1957.
Elektrotechnische Zeitschrift, Dec. 10, 1962.

*Primary Examiner*—John D. Smith
*Attorney, Agent, or Firm*—Hill, Van Santen, Steadman, Chiara & Simpson

[57] ABSTRACT

An impregnated electrical capacitor employing a dielectric which at least in part comprises plastic foils, in which the dielectric is expanded by an impregnating agent to substantially eliminate objectionable gaps filled with air or impregnating material whereby the breakdown strength provided by the dielectric foils is not impaired. In producing such capacitor, the temperature during and after impregnation and the degree of winding compression or tightness may be varied to provide desired control of the expansion and insure complete impregnation and control of the final volume, as compared with the original, of the capacitor structure.

6 Claims, 3 Drawing Figures

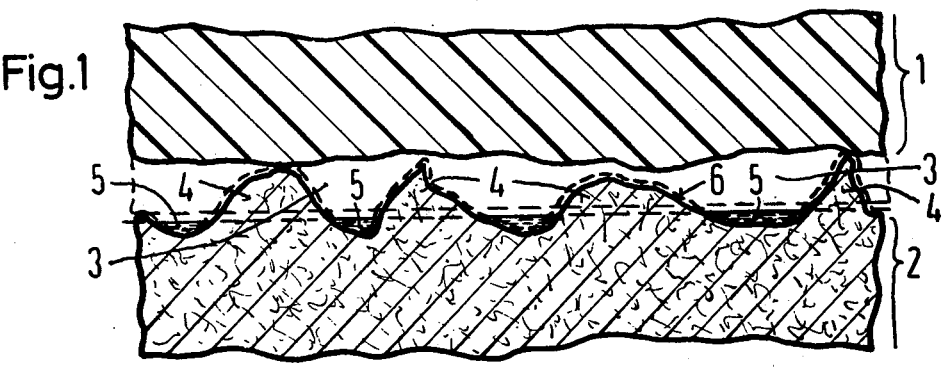

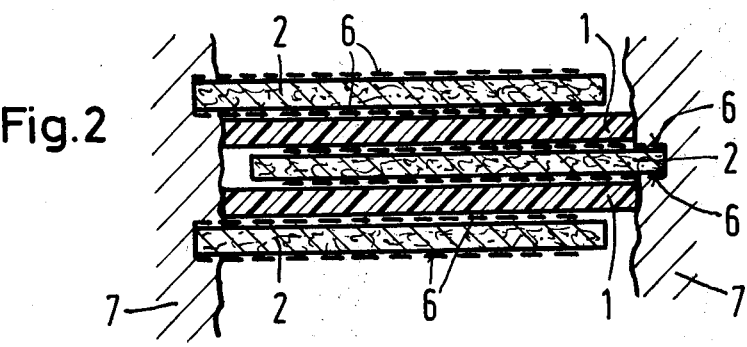

Fig.3

| WINDING THE CAPACITOR AND THE DEGREE OF WINDING COMPRESSION MAY BE VARIED TO PROVIDE CONTROL OF THE FLOW SPEED OF THE IMPREGNATING AGENT |
|---|
| IMPREGNATING AT A TEMPERATURE AT WICH THE EXPANSION PROCEEDS SLOWLY IN COMPARISION TO THE FLOW SPEED OF THE IMPREGNATING AGENT |
| SUBJECTING THE DIELECTRIC FOIL, SUBSEQUENT TO THE IMPREGNATION, TO FURTHER EXPANSION AT AN ELEVATED TEMPERATURE |

METHOD OF MAKING IMPREGNATED ELECTRICAL CAPACITOR EMPLOYING PLASTIC FOIL DIELECTRIC

The present application is a division of Ser. No. 650,621 filed Jan. 20, 1976, now abandoned which is a continuation of Ser. No. 308,022 filed Nov. 27, 1972, now abandoned which is a continuation of Ser. No. 856,220 filed Sept. 8, 1969, now abandoned which is a continuation of Ser. No. 689,493 filed Dec. 11, 1967 which application has a priority date in Germany, Ser. No. S107,565 filed Dec. 23, 1966, now abandoned.

The invention relates to an impregnated electrical capacitor, the dielectric of which consists at least in part of plastic foils, in particular a capacitor for alternating current.

Electrical capacitors, especially those for a.c. voltage operation, as is well known, are impregnated in order to fill out hollow spaces or voids in the capacitor body which lead to corona discharges. Hollow spaces are located, for example, between the surfaces of the dielectric foils and the overlying capacitor element, since these surfaces are never completely smooth. Moreover, there are pores in the dielectric, in the case of plastic foils relatively few, which also must be filled with impregnating agent in the same manner as the air gaps between overlying capacitor elements and dielectric foil.

As the breakdown strength of the impregnating agents is low, as compared to that of plastic foils, if a certain field strength in the capacitor is exceeded, partial breakdowns take place in the impregnating composition, especially in the gaps between dielectric foil and overlying capacitor elements. From the impregnating composition, for example, an insulating oil, gas is then given off, creating gas-filled hollow spaces, in which corona discharges arise, leading to further gas formation and finally to the destruction of the capacitor.

Consequently the impregnating composition disposed in the electric field and acting as a dielectric, is the weakest point in the capacitor dielectric with respect to breakdown strength.

The invention therefore, has as an object to eliminate, in so far as possible gaps filled by the impregnating agent.

According to the invention this is achieved by utilizing a dielectric which consists, at least in part, of a plastic which is expanded by the impregnating agent.

The impregnating agent which is disposed in the gap between the foils, diffuses into the foils, which as a result begin to expand and fill the gaps to a greater and greater extent. On closer examination it will be perceived that because of the roughness of the surface there remain very small crevices filled with impregnating agent, even if the peaks and protuberances are largely pressed flat by the compression of the surfaces upon one another. This residual impregnating agent, (as well as residues in the pores of the dielectric which can never be avoided) as tests have shown, do not lead to a weakening of the breakdown strength provided by the dielectric foils.

The reason why these slight oil volumes show no appreciable corona manifestations probably lies in the fact that, in the first place, the breakdown strength of thin oil layers increases with decreasing thickness, and, in the second place, the corona manifestations diminish as the gas bubble size decreases.

For every system of expandable plastic dielectric and impregnating agent there exists a certain maximal expansion, which should be sufficient to fill the entire gap. On the other hand, it is possible to influence the gap by the tightness or compression created during the winding of the capacitor, the gap becoming narrower with increasing winding tightness. The winding compression cannot, however, be arbitrarily increased, or the gap will become so narrow that impregnating difficulties will arise. In a further development of the invention therefore, there is specified a minimum expansion of each expandable dielectric foil, which amounts to $0.3\mu$.

Difficulties can arise in the impregnating through the expansion of the plastic foils. As soon as the impregnating agent flows into the faces at the sides of the capacitor, the expansion commences thereat. The gap is thereby narrowed and continuation of the flow of impregnating agent is practically prevented. The expansion, therefore, must be controlled to fully take effect only after the capacitor has been completely impregnated throughout. The interplay of impregnating speed and expansion speed can be controlled in two ways whereby a good impregnation throughout is always assured. In the first place, the impregnating process can be influenced by the temperature, as the expansion speed and the viscosity of the impregnating agent are dependent on the temperatures. Consequently there must be sought an impregnating temperature at which the expansion proceeds slowly in comparison to the flow speed of the impregnating agent into the gap. In the second place, it is possible to exert an influence on the impregnating process by the winding compression, and, therefore, over the air gap width.

Since the expansion speed and flow speed in the gaps are in opposition, the impregnating difficulties increase appreciably as the winding length increases. Lond windings need considerably longer impregnating times, as a result of which the expansion at the beginning of the winding is too far advanced before thorough impregnation can be completed. More exact investigations of expansion in plastic foils have disclosed that only the expansion speed is influenced by the temperature level, but also the extent of the expansion. Some values for polypropylene foils can be found in the following table:

| Temperature | 20° C. | 40° C. | 75° C. | 95° C. | 125° C. |
|---|---|---|---|---|---|
| Duration of the swelling process | 150 min | 70 min | 70 min | 70 min | 70 min |
| Relative increase in thickness | 3% | 4% | 7% | 11% | 20% |

Consequently, modifications in the impregnation may be achieved in this manner, with the impregnation being effected at such low temperatures that the magnitude of the expansion is still relatively small, so that the gap does not close. A good impregnation throughout is thereby always assured, even if, in consequence of the elevated viscosity of the impregnating agent, longer times are required therefor, which however, do not necessarily have to be spent in the impregnating equipment. Also in the finished capacitor which stands under oil the final thorough impregnation can take place. In order to completely expel any residual oil gaps, the capacitor can be heated to a higher temperature after complete impregnation. The magnitude of the expansion of the plastic foil is thereby increased, the oil is absorbed, and, if the temperature is sufficiently high, the oil gap disappears entirely. This swelling is irreversible and consequently the oil gap before the expansion is, in so far as possible, exactly as great as that of the expanded plastic foil following the expansion operation. If the volume of the impregnated foil decreases with respect to the initial combined volume of the expanded foil and oil gap, hollow spaces then arise which lead to discharges in the capacitor. If the volume of expanded foil increases with respect to the volume of the expanded foil and oil gap, residual oil is then pressed out of the capacitor and mechanical tensions arise in the winding. It is therefore preferable that, the volume of the expanded foil be identical with, or slightly larger than the volume of the unimpregnated foil plus the oil gap.

BRIEF DESCRIPTION OF THE DRAWINGS

FIG. 1 is a cross-sectional view of a capacitor element which is magnified to show the gaps which are filled by the present invention.

FIG. 2 is an illustration of the arrangement of the various layers of a capacitor of the present invention, and FIG. 3 is a flow chart illustrating the method of forming a capacitor according to the present invention.

The invention will be explained in detail with the aid of the figure, which represents a cross-section of portions of two adjacent foils. Between the surfaces of an expandable foil 1 and an unexpandable foil 2, which can be a metal capacitor element, a covering or a further dielectric foil, there form hollow spaces and gaps 3, which in the impregnation are filled entirely or partially with impregnating agent. In the expansion of the foil 1, the protuberances and peaks 4 projecting from the surface of the foils fit themselves snuggly against one another, as schematically represented by the broken lines. Slight residues of impregnating agent 5 do not appreciably weaken the breakdown strength of the capacitor, as has already been discussed.

In a particular application of the invention, the dielectric consists of polypropylene foil and the impregnating agent comprises an insulating oil containing 10 to 20% of aromatic constituents which can bind, in particular, hydrogen, (such as an unsaturated hydrocarbon) about 30% of naphthenic constituents and between 50 and 60% of paraffinic constituents. In such an expandable system there results, as the most favorable impregnating temperature, a room temperature up to ca. 60° C. At 110° C., for example, with normal winding compression or tightness further impregnation is no longer possible, since the expansion proceeds so rapidly that despite the oil viscosity, which is very low at this temperature, the faces of the foils close tightly before the capacitor interior has had an opportunity to be filled with oil.

In a specific embodiment of the invention, employing polypropylene foil as the dielectric, the impregnating oil utilized is known under the trade name "Shell K8" and has a quantitative composition as follows:

Paraffin 56.4%
Naphthene 29.3%
Aromates 14.3%

The paraffin constituent has a structural formula . . .
CH$_2$—CH$_2$—CH$_2$—CH$_2$—CH$_2$ . . .
The napthene constituent has a structural formula

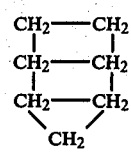

The aromatic constituent has a structural formula

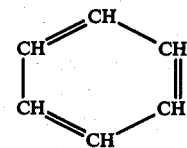

Utilization of the present invention is of particular importance in capacitors whose dielectric consists of self-supporting plastic foils and in which a metallized layer of insulating material on both sides forms a covering. The layer of insulating material may consist, for example, of paper and during operation lies in the field-free space.

Changes may be made within the scope and spirit of the appended claims which define what is believed to be new and desired to have protected by Letters Patent.

We claim:

1. A process for producing an electric, impregnated ac capacitor where the ac capacitor has a dielectric formed of a wound synthetic polypropylene film and electrodes formed of paper bands metallized on both sides such that the paper bands reside in the field-free space between the metallized surfaces thereof, comprising the steps of winding the dielectric and metallized paper bands with a predetermined tension so that the space lying between the surface of the dielectric when impregnated and the adjacent metallized surface is predetermined to be of sufficient volume to be completely filled by an anticipated swelling of the dielectric film, completely impregnating the capacitor at a first temperature, carrying out said impregnation with an insulating oil which contains hydrogen-binding aromatic fractions as well as naphthene and paraffin fractions, subsequently, following complete impregnation, treating the capacitor at a second elevated temperature which is effective for producing a swelling of the dielectric film in an amount which causes the swelled film to occupy the entire space previously occupied between the surface of the unswelled film and the adjacent metallized surface such that the resulting dielectric is practically free of oil or air gaps.

2. A method of producing an electrical capacitor according to claim 1, in which the capacitor structure is impregnated at a temperature at which the expansion proceeds slowly in comparison to the flow speed of the impregnating agent.

3. A method of producing a wound electrical capacitor according to claim 1, in which control of the impregnating speed is effected by control of the winding tightness.

4. A method of producing an electrical capacitor according to claim 1, in which the capacitor structure is impregnated at a temperature at which the plastic foil expands only slightly.

5. A method of producing an electrical capacitor according to claim 1, wherein the impregnating agent comprises an insulating oil which contains 10 to 20% aromatic constituents mainly binding hydrogen, about 30% naphthenic constituents and between 50 and 60% paraffinic constituents, the capacitor structure being impregnated at about 60° C.

6. A process for producing an electric, impregnated ac capacitor where the ac capacitor has a dielectric formed of a wound synthetic polypropylene film and electrodes formed of paper bands metallized on both sides such that the paper bands reside in the field-free space between the metallized surfaces thereof comprising the steps of winding the dielectric and metallized paper bands with a predetermined tension so that the space lying between the surface of the dielectric when impregnated and the adjacent metallized surface is predetermined to be of sufficient volume to be completely filled by an anticipated swelling of the dielectric film, completely impregnating the capacitor at a first temperature of approximately 60° C., said impregnation being carried out with an insulating oil which contains hydrogen-binding aromatic fractions as well as naphthene and paraffin fractions which cause minimum swelling of 0.3 $\mu$m of the dielectric film, subsequently, following complete impregnation, treating the capacitor for at least 70 minutes at a higher temperature predetermined to produce swelling of the dielectric film of such a magnitude as to completely fill the space previously existing between the surface of the unswelled film and the adjacent surface of the adjacent metallized surface such that the resulting dielectric is practically free of oil or air gaps.

* * * * *

UNITED STATES PATENT AND TRADEMARK OFFICE
CERTIFICATE OF CORRECTION

PATENT NO. : 4,170,665
DATED : October 9, 1979
INVENTOR(S) : Reinhard Behn et al.

It is certified that error appears in the above-identified patent and that said Letters Patent is hereby corrected as shown below:

On the title page under the heading "Foreign Patent Documents"

"19831 of Fed. Rep. of Germany" should read -- 19831, 1960, Fed. Rep. of Germany --.

"1030820  5/1966 United Kingdom" should read -- 1030820 5/1966 United Kingdom --.

In Fig. 3 change the spelling of "wich" in the first line of the step in the center box to read -- which --.

Signed and Sealed this

Twenty-sixth Day of October 1982

[SEAL]

Attest:

GERALD J. MOSSINGHOFF

Attesting Officer    Commissioner of Patents and Trademarks